Feb. 3, 1970

L. H. FENNELL 3,493,804

AUTOMOTIVE HEADLAMP WITH INTEGRAL CLEANING SYSTEM

Filed April 20, 1966

INVENTOR

Lewis Harvey Fennell

Feb. 3, 1970   L. H. FENNELL   3,493,804
AUTOMOTIVE HEADLAMP WITH INTEGRAL CLEANING SYSTEM
Filed April 20, 1966   4 Sheets-Sheet 2

INVENTOR
Lewis Harvey Fennell

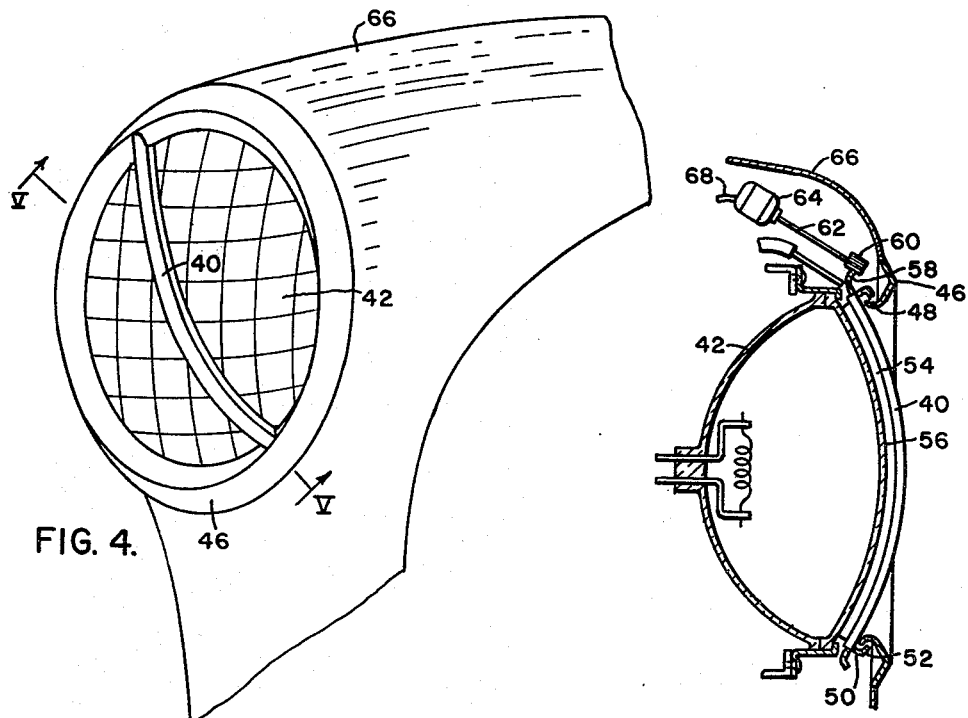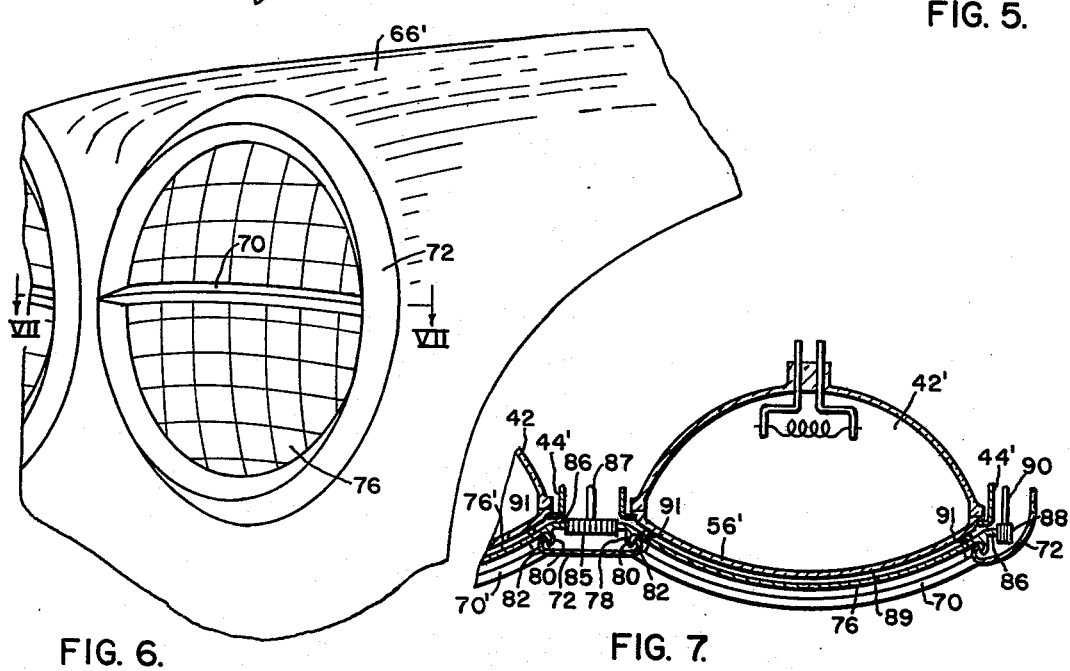

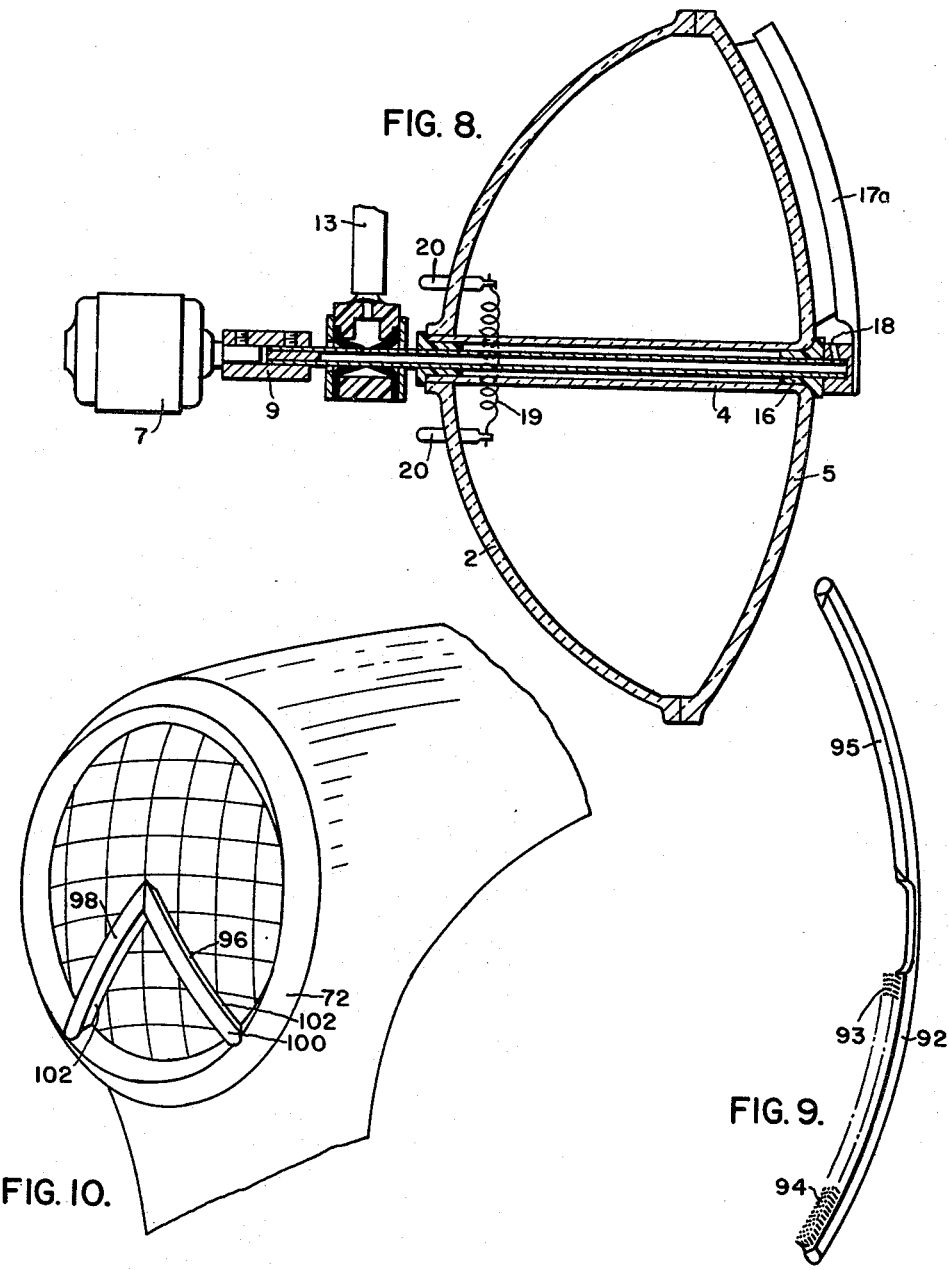

United States Patent Office 3,493,804
Patented Feb. 3, 1970

3,493,804
AUTOMOTIVE HEADLAMP WITH INTEGRAL CLEANING SYSTEM
Lewis Harvey Fennell, 141 Seminary Ave., P.O. Box 96, Greensburg, Pa. 15601
Continuation-in-part of application Ser. No. 414,711, Nov. 30, 1964. This application Apr. 20, 1966, Ser. No. 562,012
Int. Cl. B60s 1/04
U.S. Cl. 313—110      12 Claims

ABSTRACT OF THE DISCLOSURE

I disclose a headlamp cleaner comprising a wiper having flexible wiper edge means in contact with headlamp means, means for rotatably supporting one of said wiper and said headlamp means, means for driving that one of said wiper and said headlamp means so supported so that said wiper and said headlamp means are relatively rotated one against the other, and means for applying cleaning fluid to the surface of the headlamp.

---

This invention relates to headlamp cleaners. More specifically, it relates to automotive headlamp cleaners employing a rotary wiper which cleans the surface of the lenses of the headlamp.

The present application is a continuation-in-part of my copending application entitled Automotive Headlamp Cleaner, filed Nov. 30, 1964, Ser. No. 414,711, now abandoned.

It is well known that the effectiveness of automobile headlamps is sharply reduced, especially in winter, by the accumulation of road dirt on the lenses. This accumulation is caused when dirt ladened water splashed on the headlamps is evaporated by the heat of the headlamps leaving the suspended dirt coated upon the lenses. At night and in bad weather, it is inconvenient and dangerous to get out of the car and wipe the headlamps. It is also dangerous to continue driving with the effectiveness of the headlamps impaired.

The instant invention solves the problem by providing a means for mechanically cleaning the headlamps which is activated from within the car.

Preferably, I provide a sealed-beam headlamp having an integral tubular passage extending through the center of the headlamp lens rearwardly through the end of the headlamp opposite the lens.

I prefer to provide a motor means positioned with its drive shaft in a coaxial plane with the tubular passage in the headlamp. I further prefer to provide a tubular member in drive relationship with the motor drive shaft and extending through but not touching the sides of the tubular passage in the headlamp. I journal the tubular member at both ends of the tubular passage by means of low-friction pressure fittings, preferably of Teflon.

The tubular member is also preferably journaled in a gland positioned between the rear end of the headlamp and the motor means. The gland is connected in fluid flow relationship with a liquid reservoir and introduces the liquid from the reservoir into the tubular member through holes in the tubular member adjacent the gland.

At the end of the tubular member extending through the lens, I prefer to provide wipers extending in opposite directions at a substantially perpendicular angle from the tubular member, said wipers being in longitudinal contact with the lens.

I further prefer to provide holes in the tubular member adjacent to the wipers for the introduction of the liquid onto the lens surface.

In the foregoing general statement, I have set out certain objects, advantages and purposes of this invention. Other objects, advantages and purposes will be evident from a consideration of the following description and accompanying drawings in which:

FIGURE 4 is an isometric view of still another form of my headlamp cleaner incorporating a modified arrangement for concealing the supporting and rotating mechanism for the cleaner;

FIGURE 5 is a vertically sectioned view of the apparatus as shown in FIGURE 4 and taken along the reference line 5—5 thereof;

FIGURE 6 is an isometric view of still another form of my headlamp cleaner mechanism employing a stationary wiper blade;

FIGURE 7 is a horizontally sectioned view of the apparatus as shown in FIGURE 6 and taken along reference line 7—7 thereof;

FIGURE 8 is a partial longitudinally sectioned view of a modified form of the apparatus as shown in FIGURE 1 and arranged according to the invention;

FIGURE 9 is an enlarged, isometric view of a modified wiper blade arrangement suitable for use with the headlamp cleaner mechanism; and FIGURE 10 is an isometric view of my headlamp cleaner mechanism and illustrating still another modification of the wiper blade structure.

Figure 1:
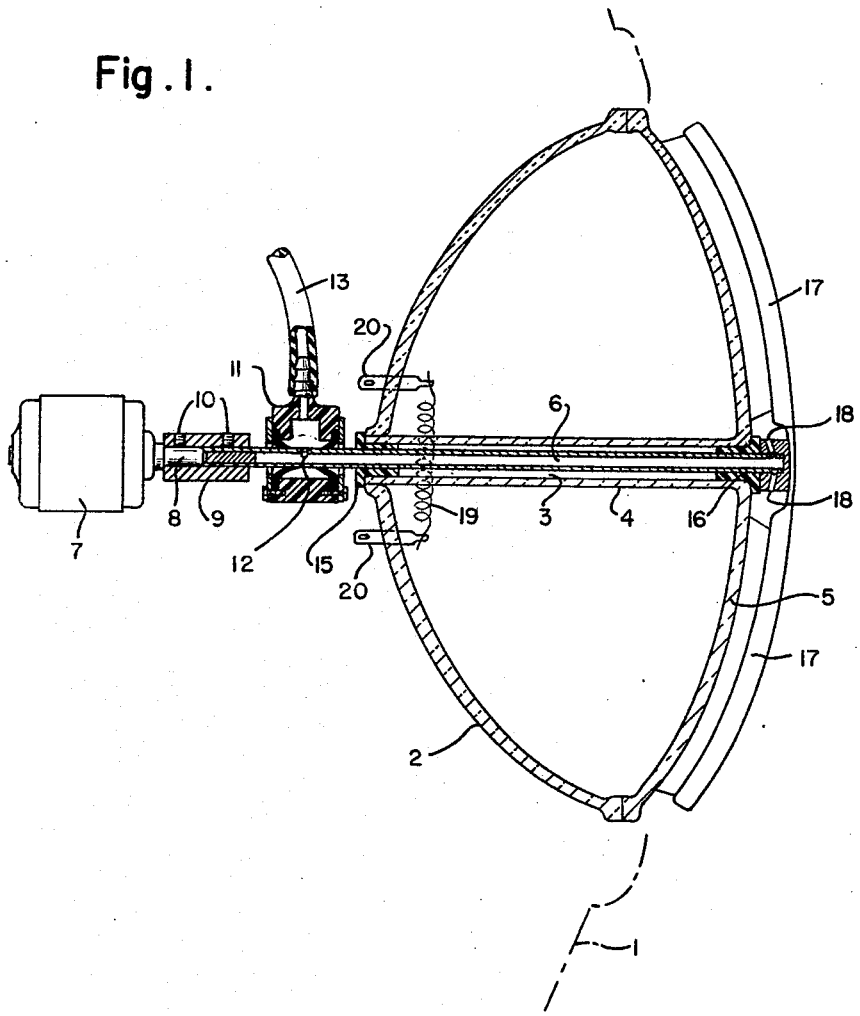
FIGURE 1 is a longitudinally sectioned view of one arrangement of my headlamp cleaner mechanism.

Referring to FIGURE 1, I have illustrated the headlamp 2 as mounted on the vehicle 1. Headlamp 2 has an integral tubular passage 3 defined by a Pyrex glass wall 4. A motor 7 is positioned with its driveshaft 8 in a direct line with passage 3. A rigid, hollow tube 6 is connected in a drive relationship with driveshaft 8 by means of coupling 9 and set screws 10. Teflon bushings 15 and 16 journal tube 6 and space it centrally from wall 4. Tube 6 is further journaled in a gland 11 having a fluid flow connection through conduit 13 to a conventional window washing liquid reservoir. Opening 12 in the portion of tube 6 covered by gland 11 allows liquid from the reservoir to enter tube 6. Wipers 17 preferably of Plexiglas or other suitable transparent material are mounted at the outer end of tube 6 and are in longitudinal contact with headlamp lens 5. Openings 18 in tube 6 adjacent wipers 17 allow liquid in tube 6 to be directed onto lens 5. Filaments 19 are spaced around the wall 4 of passage 3 and are connected to the vehicle's electrical system through contacts 20. Rotary motion is imparted to wipers 17 by the motor 7 and liquid is forced from the reservoir by conventional means through tube 6 and openings 18 onto lens 5. The combination of rotary motion and liquid flow breaks up and removes the caked dirt on lens 5.

Figure 2:
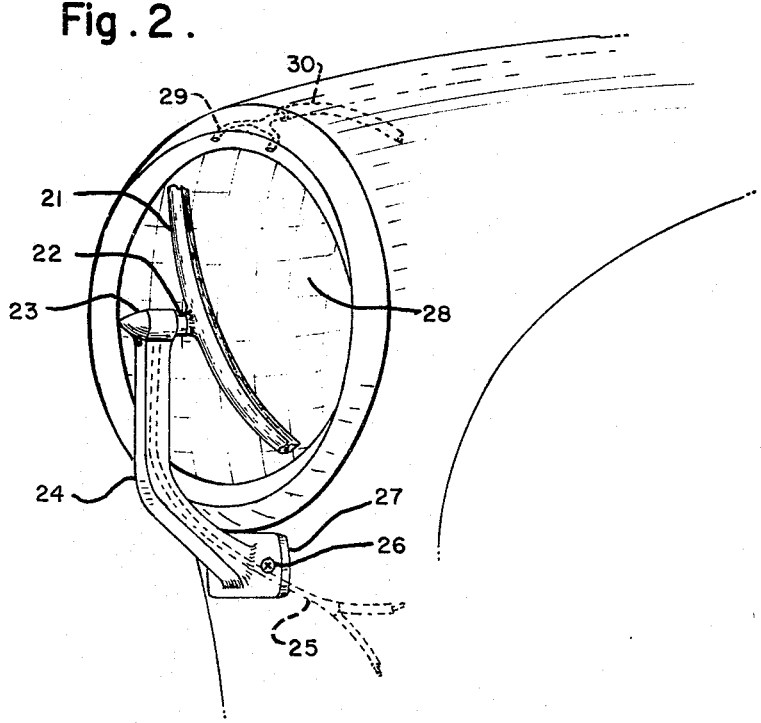
FIGURE 2 is an isometric view of another form of my headlamp cleaner mechanism with the driving means therefor incorporated in the supporting bracket for the mechanism.

FIGURE 2 shows the application of the invention to a conventional headlamp in which a Plexiglas arm or support having a base which is fastened to the body of the car by screws 26. A motor 23 is positioned at the upper end of support 24. Wires 25 lead from motor 23 downwardly through the hollow center of support 24 to a point inside the car where they are joined to the car's electrical system. Shaft 22 turned by motor 23 has a wiper 21 of a suitable material, connected to it and having longitudinal contact with the headlamp lens 28. Openings 29 connected through tube 30 to a conventional window washing liquid reservoir introduce water onto the lens.

Figure 3:
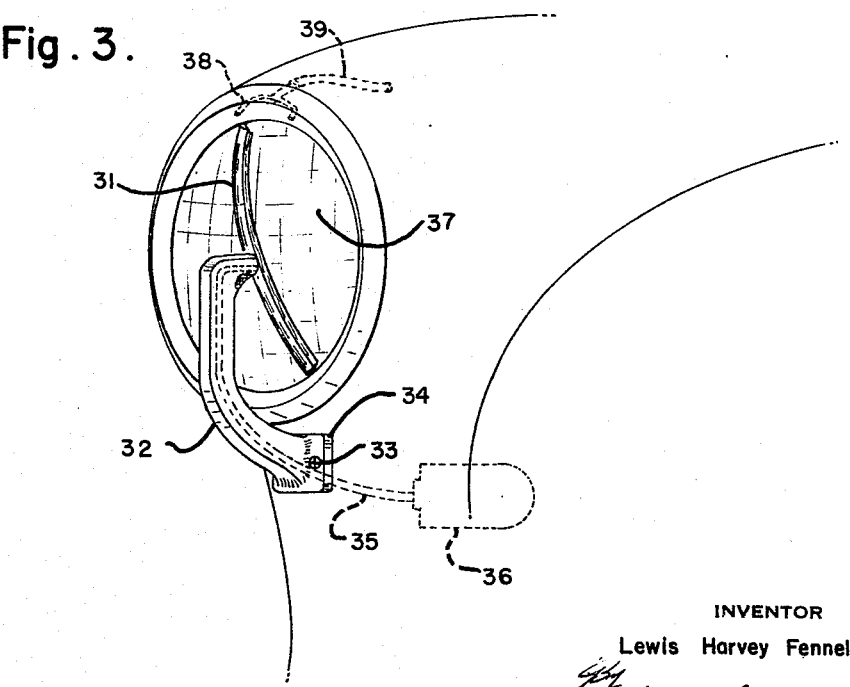
FIGURE 3 is an isometric view of another arrangement of my headlamp cleaner, similar to that shown in FIGURE 2 but with the driving means therefor remotely located.

FIGURE 3 shows an alternative embodiment as applied to a conventional headlamp in which the motor 34 is spaced from the support and drives blade 29 by means of cable 33. Water is introduced through openings 38 in fluid flow connection with a conventional window washing reservoir through tube 39.

With reference now to FIGURES 4 and 5 of the drawings, another arrangement for concealing the driving mechanism for a rotary-mounted wiper blade 40 is illustrated such that, generally speaking, only the wiper blade 40 of the mechanism is readily apparent to an observer, as is the case with the modification shown in FIGURE 1 of the drawings. In the arrangement of FIGURES 4 and 5, however, a conventional headlamp 42, mounted in the conventional manner, as by circular bracket 44, can be utilized. The circular bracket 44, however, is concealed, as better shown in FIGURE 5, behind a normally appearing headlamp rim 46 having rolled portion 48 extending about its inner periphery.

Another circular bracket 50, to which the wiper 40 is supportingly secured, is formed with a cooperating rolled portion 52 at its outer periphery for complementary insertion into the rolled portion 48 of the headlamp rim 46 where it is thus rotationally mounted. When assembling the circular wiper bracket 50 and the headlamp rim 46, the circular bracket 50 is first provided with its rolled portion 52 and aligned as illustrated in FIGURE 5 with the headlamp rim or bezel 46. The headlamp rim is then rolled at 48 to rotatably retain the circular bracket 50 therein, in this example. When the headlamp rim 46 is mounted by suitable bracket (not shown) with reference to the headlamp 42, a wiper blade 54 of the wiper 40 is provided with such width as to bear upon the outer surfaces of headlamp lens 56. As better shown in FIGURE 5, both the wiper and the wiper blade 54 are provided, in this example, with an arcuate configuration so as to follow complementarily the contour of the lens 56. It is contemplated that a stationary light-transmitting lens cover (not shown), otherwise similar to the lens cover or shield 76 described below with reference to FIGURES 6 and 7, can be interposed between the blade 54 and the lamp 42 for protection of the latter so that the shield is cleaned instead by the blade 54. Such shield 76 and the headlamp lens 56 (and their equivalents) are sometimes hereinafter referred to collectively or generically as "headlamp means."

Rotation of the wiper bracket 50 is effected by means of a circular gear or rack 58 secured to the outer periphery of the wiper bracket 50 but concealed behind the headlamp rim 46. The circular rack 58 is thus disposed for engagement by pinion 60 mounted upon shaft 62 of a suitable driving means such as an electric motor 64 mounted within the fender structure 66. It will be appreciated that the angularity of the circular rack 58 relative to the wiper bracket 50 can be changed, and with it the length of the motor shaft 62 in order to accommodate the driving means to any one of the many differing fender and headlamp rim configurations. The motor 64 can be supplied by means of leads 68 from the electrical system of the automobile. Operation of the cleaning mechanism can be controlled, by a suitable switch (not shown) coupled in the supply circuit for the motor 64 and located on the dash of the automobile.

It will be understood that the rim or bezel 46 can be rotatably mounted on the fender 66 by similar interfitting rolled portions (not shown) or by other suitable rotational and bearing means. In the latter arrangement, the rim 46 can be provided with the circular rack 58 or equivalent. The wiper 40 then can be mounted directly upon the rotatable rim 46, in this example, for rotation therewith, and the circular bracket 50 eliminated.

If desired, water or a water and detergent solution can be applied to the headlamp lens 56 during the cleaning operation through openings 38' in fluid flow connection with a conventional window washing reservoir through tube 39'.

Referring now to FIGURES 6 and 7 of the drawings, another modification of my headlamp cleaning mechanism is illustrated where similar reference characters with primed accents refer to similar components of FIGURES 4 and 5. In the latter exemplification of the invention, a stationarily mounted wiper 70 is employed in order to render the cleaning mechanism even less obvious to the observer. In this form of the invention, the wiper 70 is secured at its ends to a stationary headlamp rim 72 which is mounted upon the fender 66' in the usual manner. The headlamp 42' and circular mounting bracket 44' are mounted immediately behind the headlamp rim in alignment therewith, as set forth above with reference to FIGURES 4 and 5. Between the stationary wiper 70 and the headlamp lens 56' a headlamp cover or shield 76 is rotatably mounted. At least the major proportion of the cover 76, i.e., that portion coextensive with the lens 56', is fabricated from a good, light-transmitting material such as glass or suitable plastic such as Lucite. The cover 76, of course, need not be provided with a lens system and, therefore, can be rotated without changing the light pattern of the headlamp 42'.

At its periphery the lens cover 76 is joined to circular bracket 78 of similar configuration and function as the circular bracket 50 of FIGURES 4 and 5. Thus, the bracket 78 is rotatably mounted within the headlamp rim 72 by means of their respective interfitting rolled-over portions 80 and 82.

With this arrangement, of course, highway dirt and other soil accumulation occurs on the outer surface of the headlamp shield or cover 76, leaving the surface of the headlamp lens 56' free from dirt. Such soil is removed from the headlamp shield 76 by rotating it relative to stationary blade 84 of the wiper 70, which blade is of sufficient width to bridge the gap between the shield 76 and the wiper 70. For purposes of appearance the headlamp shield 76 can be provided with an arcuate configuration, as better shown in FIGURE 7, in which case the wiper 70 and its blade 84 are complementarily shaped.

Rotation of the shield 76 past the stationary wiper 70 is effected by rotating its bracket 78 in a manner similar to that employed for rotating the circular wiper bracket 50 of FIGURES 4 and 5. Thus, the bracket 78 is provided with a circular rack 86 which is driven by pinion 88 mounted on the driving shaft 90 of a suitable driving means (not shown). With the arrangement as shown in FIGURES 6 and 7 the operation of the headlamp cleaner is not apparent to the casual observer.

If desired, gap 89 between the headlamp lens 56' and the rotatable cover 76 can be more positively screened or sealed against entry of foreign matter by the installation of a wiping type circular sealing flange 91 on the rear surface of either the cover bracket 78 or the circular rack 86 for lightly wiping engagement with the forward surface of the headlamp bracket 44' or the outer periphery of the headlamp lens 56', as better shown in FIGURE 8.

FIGURES 6 and 7 also illustrate an exemplary arrangement for actuating the cleaning mechanisms 76 and 76' associated with an adjacent pair of headlamps in a dual headlamp system. In this arrangement rotary motion imparted to the rotating lens shield 76 is transferred to the adjacent lens shield 76', through its circular bracket 78' and rack 86', by means of an intermediately positioned idler gear 85. The gear 85 is rotatably mounted on shaft 87 for enmeshment with circular racks 86 and 86', and thus, the gearing train 86–85–86' is rotated by motor pinion 88. If desired, the drive motor therefor (which can be similar to the motor 64, FIGURE 4) can be coupled to the pinion shaft 90 through a suitable gear ratio unit (not shown). Of course, the circular bracket 78' can be coupled to bracket 78 for rotation therewith by other suitable means such as a belt and pulleys, etc.

It is to be understood also that the aforementioned electric motor or other suitable driving means can be coupled directly to the idler shaft 87 for direct rotation of the gear 85, in which case the pinion 88 and shaft 90 will be eliminated. Also contemplated is the fact that the blades 70, 70' can be mounted on rotatably mounted rims (not shown) in place of the stationary rims or bezels 72, 72' as noted above following the description of FIGURES 4 and 5 with reference to the rim 46. In the case where the rims 72, 72' are so replaced, the shields 76, 76' will be stationarily mounted as by securance to the stationary headlamp supports 44', or the shields 76, 76' can be eliminater altogether and the blades of the wipers 70, 70' can bear directly upon the lenses of the headlamp 42'. Although a dual headlamp system is shown in FIGURES 6 and 7 it will be understood that appropriate features of the invention apply with equal force to a single headlamp system, as shown in FIGURES 6 and 7. By the same token the features of the invention as depicted in FIGURES 1–5 described above and in FIGURES 8–10 presently to be described can be employed in dual headlamp systems following the teachings of FIGURES 6 and 7.

A pair of the circular brackets 50, such as shown in FIGURES 4 and 5, likewise can be coupled in a dual headlamp system (not shown) for simultaneous rotation of a pair of the wipers 40. In the latter arrangement it is contemplated that the circular brackets and the cooperating rolled portions 48, 52 will be more deeply recessed into the associated headlamp rims, such as rim 46, to provide the necessary clearance. It is aslo considered that, where spacing of an adjacent pair of headlamps permit, the circular racks, such as 86 and 86' of FIGURE 7, can be enmeshed directly (not shown) for contrarotation.

It will also be apparent that a single radius or half-blade can be substituted for any of the diametric or double wiper arrangements shown in the drawings. Such substitution is depicted exemplarily by half-blade 17a in FIGURE 8 of the drawings, which shows a cleaning mechanism otherwise generally similar to that of FIGURE 1.

In FIGURE 9 of the drawings, a modified form of a wiper assembly 92 is illustrated which can be utilized with the cleaning mechanism of the invention. In the example, the wiper assembly includes a two-part cleaner 93, one half of which is an elongated relatively thin brush 94 while the other half of the cleaner 93 is a squeegee type blade 95, similar to that shown in the preceding figures. This arrangement is particularly useful for removing heavy soil, which is preliminarily loosened by the brush portion 94 of the cleaner 93 and then wiped clean from the lens or lens cover, as the case may be, by the squeegee blade 95.

In FIGURE 10 a radial configuration of wiper arrangement is illustrated. In the latter form of the invention, a wiper 96 is provided in the form of a pair of radial arms 98 and 100 the outer ends of which are secured to the headlamp rim 72' while the inner ends are secured together for strengthening purposes. A suitable blade or cleaner structure 102 is secured to each of the arms 98, 100. The cleaner 102 can be formed as shown in FIGURE 9 or as in any of the preceding figures, or alternatively one of the cleaners 102 can be of brush configuration while the other can be of a squeegee type. It is also contemplated that a single radial arm (not shown) supported in cantilevered fashion from the headlamp rim can be utilized.

In other embodiments, the aforementioned motor means can be run by a vacuum as windshield wipers are or by connection with any moving part of the car, or any other suitable means.

From the foregoing it will be apparent that novel and efficient forms of headlamp cleaners and similar cleaning mechanisms have been disclosed herein. While I have illustrated and described certain preferred embodiments of my invention in the foregoing specification, it will be understood that this invention may be otherwise embodied within the scope of the following claims.

I claim:
1. A headlamp cleaner comprising wiper means in contact with headlamp means, means for rotatably supporting one of said wiper means and said headlamp means, means for driving that one of said wiper means and said headlamp means so supported so that said wiper means and said headlamp means are relatively rotated one against the other, said headlamp being a sealed-beam lamp having integral tubular passage means extending generally centrally therethrough to the central area of its lens, filament means surrounding the tubular passage, rigid conduit means within the tubular passage positioned centrally and rotatably therein by bearing means, a liquid source in fluid-flow relationship to a portion of the rigid conduit, motor means in driving relationship with the rigid conduit, said wiper means being fastened to the end of the rigid conduit which extends through the lens, said wiper means being in longitudinal contact with the lens, and flow openings in the rigid conduit adjacent said wiper means for conducting fluid thereto from said liquid source.

2. The combination according to claim 1 wherein said openings are grouped circumferentially in a portion of the rigid conduit means extending beyond the rear of the headlamp, and a gland in fluid-flow relationship to said liquid source journals the conduit means and encloses the openings.

3. The combination according to claim 2 wherein said bearing means include low-friction pressure fittings positioned at opposite ends of the passage means, said rigid conduit means being journaled in said pressure fittings, and said motor means have a drive shaft connected coaxially to the rigid conduit means by coupling means.

4. A headlamp cleaner comprising wiper means in contact with headlamp means, means for rotatably supporting one of said wiper and said headlamp means, means for driving that one of said wiper means and said headlamp means so supported so that said wiper means and said headlamp means are relatively rotated one against the other said headlamp means having integral tubular passage means extending therethrough, said passage means opening in the central portion of its lens, a drive shaft extending through said passage means and rotatably mounted therein, said shaft being coupled to said driving means at the rear side of said lamp and to said wiper means at the lens side of said lamp.

5. An automotive headlamp cleaning system comprising wiper means mounted for wiping engagement with headlamp means, said headlamp means including a headlamp having an integral tubular passage means extending therethrough, and driving means extending through said tubular passage means and coupled to said wiper means for actuating the same.

6. The combination according to claim 5 wherein means are provided for depositing cleaning fluid upon the surface of said headlamp engaged by said wiper means to facilitate cleaning thereby, and said cleaning fluid depositing means include a tubular drive shaft for said wiper means extending through said tubular passage means and coupled in fluid communication with a source of said cleaning fluid.

7. The combination according to claim 5 wherein filament means for said headlamp generally surround said tubular passage means.

8. A headlamp for an automotive headlamp cleaning system and the like, said headlamp comprising a sealed glass envelope, an integral tubular passage member extending through the interior of said envelope and sealingly joined at its ends respectively to adjacent wall portions of said envelope, a filament mounted within said headlamp and enclosed between said envelope and said passage member, and means for connected said filament to a source of electric potential, said passage member providing a passageway extending through said headlamp and sealed from the interior thereof.

9. The combination according to claim 8 wherein said passage member opens at one end at the central area of a lens forming part of said headlamp.

10. The combination according to claim 8 wherein filament means for said headlamp generally surround said tubular passage member.

11. The combination according to claim 5 wherein said wiper means are fabricated from transparent material.

12. The combination according to claim 5 wherein said driving means include a shaft rotatably mounted in said tubular passage and extending therethrough, said wiper means are mounted on one end of said shaft, and motive means are mounted adjacent the other end of said shaft and are coupled thereto for rotating the same.

References Cited

UNITED STATES PATENTS

| | | | |
|---|---|---|---|
| 1,269,395 | 6/1918 | Cranston | 15—250.22 |
| 2,787,802 | 4/1957 | Reed-Lethbridge | 15—250.22 |
| 3,138,816 | 6/1964 | Abodeely | 15—250.41 |
| 2,178,068 | 10/1939 | Cordova | 15—250.22 |
| 2,288,429 | 6/1942 | Baughn | 15—250.22 |
| 2,334,508 | 11/1943 | Purden | 15—250.01 |
| 2,749,568 | 6/1956 | Bird et al. | 15—250.22 |
| 2,884,656 | 5/1959 | Bryant | 15—250.36 |
| 3,058,142 | 10/1962 | Pollock | 15—250.22 |

FOREIGN PATENTS

| | | |
|---|---|---|
| 229,252 | 1/1959 | Australia. |
| 1,041,171 | 5/1953 | France. |

JAMES W. LAWRENCE, Primary Examiner

V. LAFRANCHI, Assistant Examiner

U.S. Cl. X.R.

15—250.01, 250.22.